July 31, 1962 — L. FISHMAN — 3,047,039
VEHICLE TIRES
Filed March 16, 1959 — 2 Sheets-Sheet 1

Inventor
Louis Fishman
By Max R. Kraus
Atty.

July 31, 1962  L. FISHMAN  3,047,039
VEHICLE TIRES
Filed March 16, 1959  2 Sheets-Sheet 2
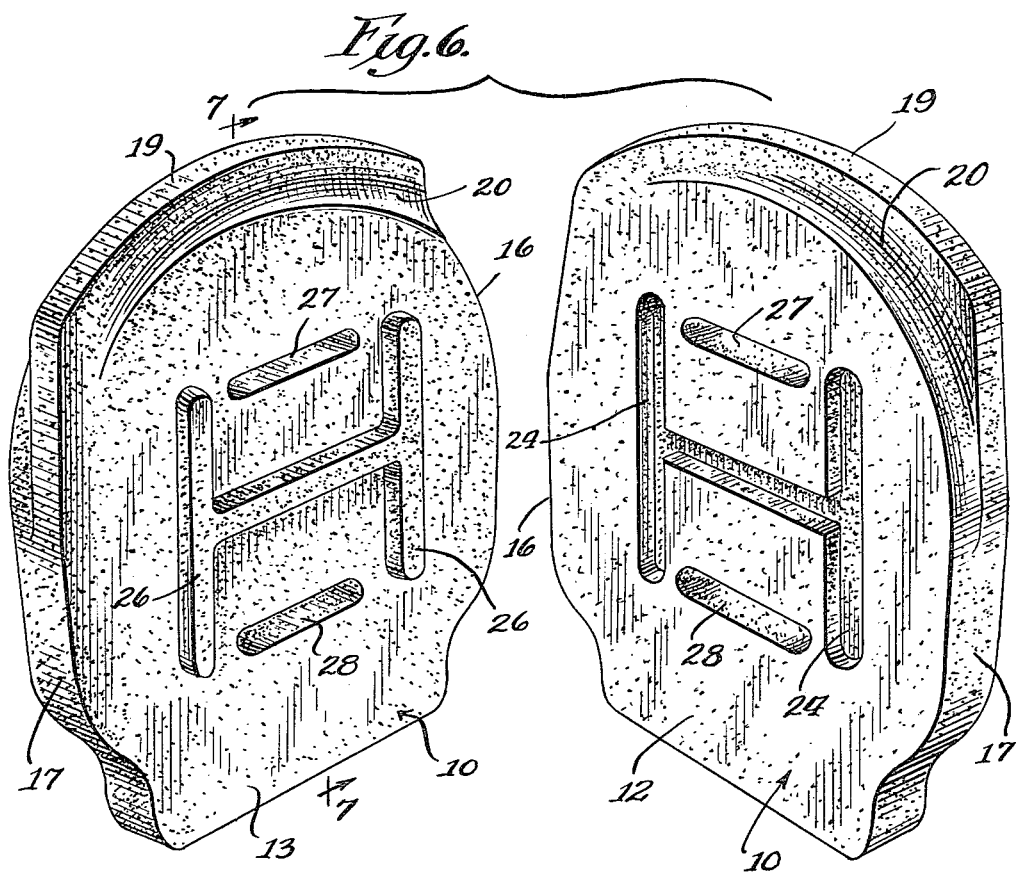
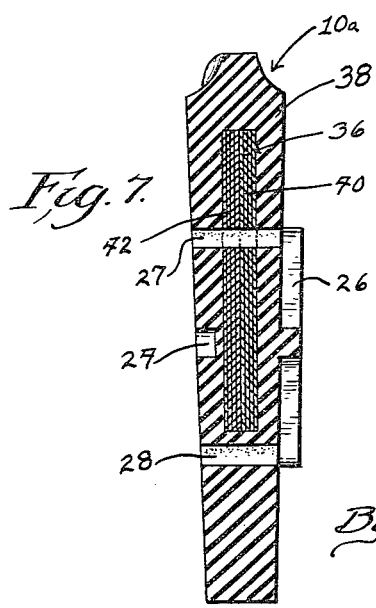
Inventor
Louis Fishman
By Max R. Kraus
Atty.

United States Patent Office 3,047,039
Patented July 31, 1962

3,047,039
VEHICLE TIRES
Louis Fishman, 442 W. Garfield Blvd., Chicago, Ill.
Filed Mar. 16, 1959, Ser. No. 799,586
2 Claims. (Cl. 152—308)

My invention relates to vehicle tires.

One of the objects of my invention is the provision of a vehicle tire comprised of a plurality of individual interlocking resilient sections suitably secured in abutting relation around the rim of a wheel.

Another object of my invention is the provision of a vehicle tire of the foregoing character having an improved traction surface which will effectively grip the ground surface to insure the travel of the tire over sandy, muddy or irregular road surfaces.

A further object of my invention is the provision of a tire of the foregoing character which is simple and durable in construction, efficient in service and inexpensive to manufacture.

Other and further objects and advantages of my invention will become apparent from the following description when considered in connection with the accompanying drawings, in which;

FIGURE 6 is a perspective view of two sections in separated relation and showing confronting cooperating surfaces, and FIGURE 7 is a cross-sectional view of a modified form of section taken on lines that would be equivalent to lines 7—7 of FIGURE 6.

Figures 3, 4, 5:
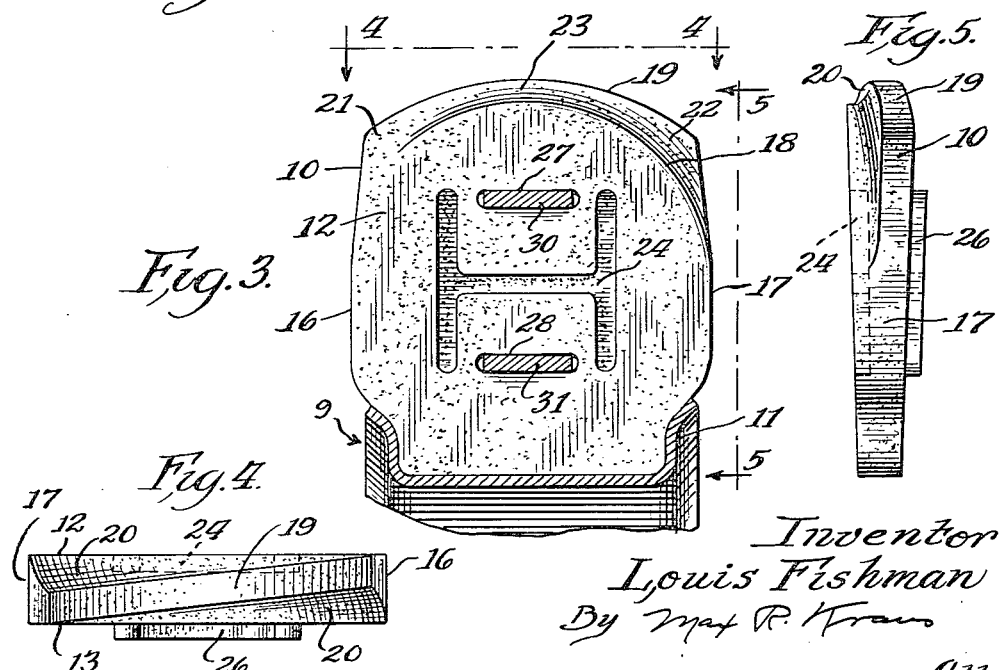
FIGURE 3 is a cross-sectional view on an enlarged scale taken on 3—3 of FIGURE 1.
FIGURE 4 is a top view of the tire section shown in FIGURE 3.
FIGURE 5 is a side elevational view of the tire section shown in FIGURE 3.

Referring to the drawing, the numeral 9 designates a tire formed of a plurality of resilient sections 10, joined together in abutting relation about the rim 11 of a conventional vehicle wheel to form a toroidal body. The sections 10 are formed of rubber or other suitable material having the desired toughness and resiliency, and each section essentially comprises a toroidal segment having sloping end walls or end faces 12 and 13 coincident with radial planes intersecting at the axis of the toroidal body. Each section 10 has a base shaped to conform to the shape of the rim 11 in which it is seated, as shown in FIGURE 3. The side walls 16 and 17 are generally parallel and connect at their upper ends with an arcuate face 18 which corresponds to the base of the tire tread.

Each of the sections 10 is provided on its face with an integral prolongation or flange 19 which extends above the face 18 and affords a cleat or tread. The flange 19 extends transversely substantially fully across the width of the section 10 and has a radius of curvature which is somewhat larger than that of the surface 18 so that the height of the flange 19 at the side portions 21 and 22 of the section is greater than in the middle portion 23 which corresponds to the center of the area of contact of the section 10 with a road surface. The flange 19 merges into the face 18 through fillets 20 so as to avoid sharp corners.

The flange 19 has a width substantially less than that of the face 18, and as seen clearly in FIGURE 4 is angularly disposed in relation to the end faces 12 and 13, the flange extending between said end faces. Thus, each of of the flanges 19 is endowed with a pitch in relation to the tire periphery when the sections are in assembled relation and the flanges substantially resemble the outer portion of a screw having square threads and bent into a circular form (see FIGURE 2).

The opposed end faces 12 and 13 of the section 10 are provided with cooperating means to afford an interlocking of the sections for the purpose of maintaining the sections in assembled alinement. Thus, the face 12 is provided with an H-shaped recess 24 while the opposite face 13 is provided with a correspondingly shaped embossing 26 in alinement therewith. It will be understood that the embossing 26 of one section is arranged to be received in the recess 24 of an adjacent section when the sections are assembled, by abutting the faces 12 and 13, as illustrated in FIGURE 6. If desired, a suitable cement may be applied to confronting end faces.

Figures 1, 2:
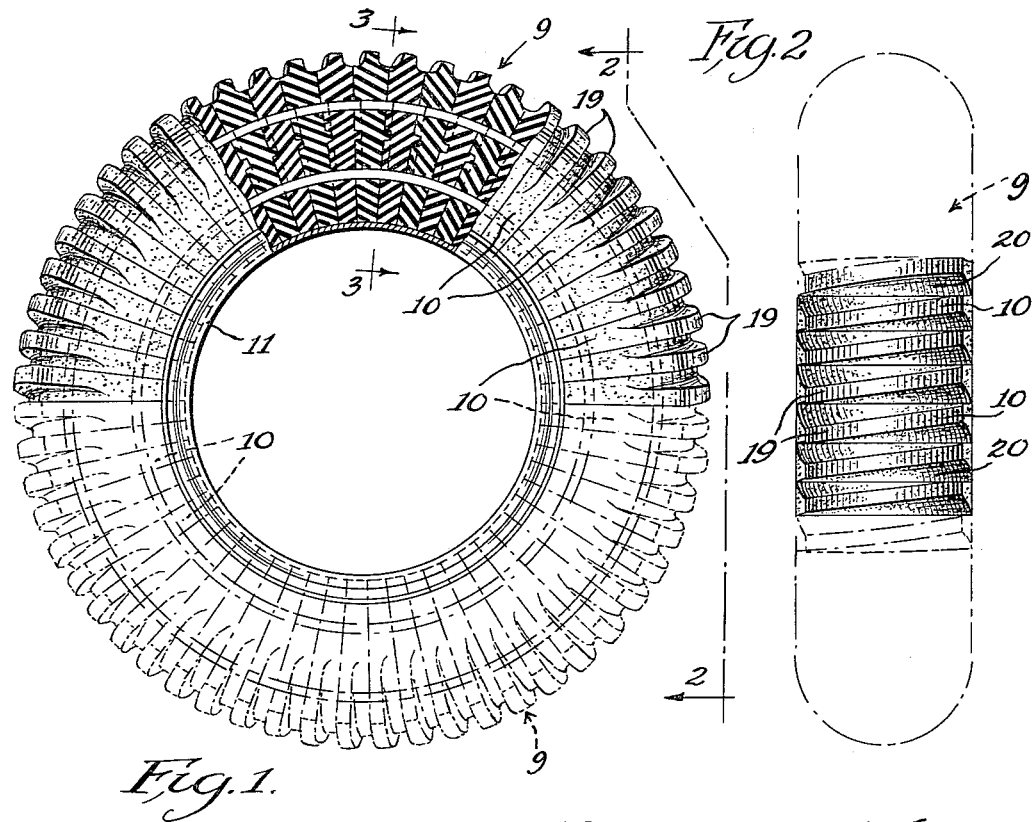
FIGURE 1 is a side elevational view of a tire in accordance with my invention, partly in section.
FIGURE 2 is an end elevational view of the same looking in the direction of arrows 2—2 of FIGURE 1.

Each of the sections 19 is further provided with a pair of spaced transverse elongated openings 27 and 28 arranged to receive metal bands 30 and 31 respectively, concentrically arranged which secure the sections 10 in assembled toroidal relation, as seen in FIGURE 1. The bands 30 and 31 are provided with conventional means (not shown) for contracting the same to secure the sections 10 into tight-abutting relation and firmly seated on the tire rim.

The sections 10 are each integrally molded of rubber or like material and are of the shape and construction heretofore described.

FIGURE 7 is a cross-sectional view of a modified section which is taken on lines that would be equivalent to lines 7—7 of FIGURE 6. This modified section 10a is formed of a core portion 36 and a molded covering or casing 38 of rubber or like material. The core portion 36 is made by cutting or stamping segments or blanks from the casings of used or discarded pneumatic tires and said core portions are then integrally molded into a covering or shell portion 38 which forms a section which in external appearance is identical to section 10 previously described. In FIGURE 7, the core portion 36 is formed of two separate blanks 40 and 42, each cut from the tire casing and positioned adjacent each other, as shown, and molded within the covering 38. The purpose of using blanks cut from tire casings, as so called fillers, for the section 10a is to reduce the material cost as well as to strengthen the section since the blanks cut from pneumatic tire casings usually comprise a combined layer of rubber and layers of rubber impregnated fabric.

It will be understood that variations and modifications may be made from the foregoing without departing from the spirit and scope of the appended claims.

I claim:

1. A tire for vehicle wheels comprising an annular rim, a series of abutting resilient sections, each section being integrally formed of a resilient material and having a base of the same material, said base conforming to the shape of the rim and seated within the rim, each section having opposed end walls tapering toward said base, each section having an outer arcuate surface between said end walls, a flange of less width than the width of the arcuate surface and extending outwardly of said surface and angularly in one continuous direction across substantially the entire width of said section and between said end walls, the radius of curvature of the radially outer surface of the flange being greater than that of the outer arcuate surface, the arcuate sections on the opposite sides of each said flange on each section being substantially identical but in opposed relation, said flanges in combination simulating substantially the outer portion of a screw having substantially square threads and bent into a circular form, and means extending through said sections for securing said sections together to form a toroidal body.

2. A tire defined in claim 1 in which the sections have cooperating means which interlock for maintaining the sections in assembled alinement.

References Cited in the file of this patent

UNITED STATES PATENTS

| | | |
|---|---|---|
| 920,735 | Hanford et al. | May 4, 1909 |
| 969,889 | Lighthouse | Sept. 13, 1910 |
| 1,077,176 | Tucker | Oct. 28, 1913 |
| 1,211,958 | Overman | Jan. 9, 1917 |
| 2,241,227 | Wait et al. | May 6, 1941 |
| 2,704,102 | Starr et al. | Mar. 15, 1955 |

FOREIGN PATENTS

| | | |
|---|---|---|
| 827,021 | France | Jan. 18, 1938 |